United States Patent
Wobben

(10) Patent No.: US 6,784,564 B1
(45) Date of Patent: Aug. 31, 2004

(54) METHOD OF OPERATING A WIND POWER INSTALLATION AND A WIND POWER INSTALLATION

(76) Inventor: Alovs Wobben, Argestrasse 19, 26607, Aurich (DE)

( * ) Notice: Subject to any disclaimer, the term of this patent is extended or adjusted under 35 U.S.C. 154(b) by 0 days.

(21) Appl. No.: 09/581,887
(22) PCT Filed: Dec. 18, 1998
(86) PCT No.: PCT/EP98/08324
§ 371 (c)(1), (2), (4) Date: Jul. 19, 2000
(87) PCT Pub. No.: WO99/33165
PCT Pub. Date: Jul. 1, 1999

(30) Foreign Application Priority Data

Dec. 19, 1997 (DE) .......................................... 197 56 777

(51) Int. Cl.⁷ ................................ H02P 9/00; H02P 9/04
(52) U.S. Cl. ........................................... 290/44; 290/55
(58) Field of Search ..................................... 290/44, 55

(56) References Cited

U.S. PATENT DOCUMENTS

| | | | | |
|---|---|---|---|---|
| 4,695,736 A | * | 9/1987 | Doman et al. ................ | 290/44 |
| 5,637,985 A | * | 6/1997 | Kakizaki et al. .............. | 322/28 |
| 6,137,187 A | * | 10/2000 | Mikhail et al. ............... | 290/44 |

FOREIGN PATENT DOCUMENTS

| | | |
|---|---|---|
| DE | 368799 | 8/1923 |
| DE | 3023195 | 12/1981 |
| DE | 3438893 | 4/1986 |
| DE | 3833719 | 10/1989 |
| DE | 4428085 | 2/1996 |

OTHER PUBLICATIONS

"Industrial Process Control" by S.G.Lloyd and G.D.Anderson. Fisher Controls, 1971.*
"Switchgear and Control Handbook" by Robert W. Smeaton. McGraw Hill, 1977.*
European Search Report dated Oct. 26, 2001, EP 01 12 2899.

* cited by examiner

Primary Examiner—Nicholas Ponomarenko
(74) Attorney, Agent, or Firm—Gottlieb, Rackman & Reisman, P.C.

(57) ABSTRACT

The present invention concerns a method of operating a wind power installation comprising an electric generator drivable by a rotor for outputting electrical power to an electrical consumer, in particular an electrical network.

The invention further concerns a wind power installation comprising a rotor and an electric gererator coupled to the rotor for outputting electric power to an electrical consumer, in particular an electrical network.

The object of the present invention is to provide a method of operating a wind power installation, and a wind power installation, which avoid the disadvantages of the state of the art and in particular avoid voltage over-fluctuations at the consumer, in particular an electrical network, and unwanted shut-down of the wind power installation.

In a method of the kind set forth in the opening part of this specification, that object is attained by the invention in that the power delivered to the network by the wind power generator is regulated in dependence on the applied network voltage of the power supply network.

22 Claims, 2 Drawing Sheets

METHOD OF OPERATING A WIND POWER INSTALLATION AND A WIND POWER INSTALLATION

BACKGROUND OF THE INVENTION

The present invention concerns a method of operating a wind power installation comprising an electric generator drivable by a rotor for outputting electrical power to an electrical consumer, in particular an electrical network.

The invention further concerns a wind power installation comprising a rotor and an electric generator coupled to the rotor for outputting electric power to an electrical consumer, in particular an electrical network.

In the known wind power installations for generating electrical energy from wind the generator is operated in parallel relationship with the electrical consumer, frequently an electrical network. During operation of the wind power installation the electric power produced by the generator varies in dependence on the prevailing wind speed and thus the wired power. The consequence of this is that the electrical generator voltage is also variable in dependence on the wind power. That gives rise to the following problems:

In the event of the electrical power generated being fed into an electrical network, for example a public power supply network, there is an increase in the network voltage at a connecting point or network junction point at which the electrical generator power is fed into the network. Particularly in the event of severe changes in the generator voltage, There are severe unwanted changes in the network voltage.

Under particular circumstances it can happen that the network voltage in the supply network rises to an undesirably high value. That is the case in particular when the power taken on the part of the consumers is very low while a high level of electrical power is being fed into the supply network. Such situations can occur for example at night when the electrical consumption in households is fairly low while with a strong wind, a wind power converter provides the power supply network with a correspondingly high level of electrical power. If the voltage in the supply network or at the network connection point of the wind power installation rises above a predetermined value, the wind power installation or the generator thereof has to be disconnected from the network and the wind power installation would have to be completely shut down from the network because it is no longer possible to take any power. A shut-down procedure of that kind results in an interruption in the feed of electrical power, which is unwanted equally From the point of view of the operator of the wind power installation and the operator of the network.

It is generally known from German patent specification No 368 799, DE-OS No 44 28 085 and DE-OS No 30 23 195 that, in installations such as wind power installations or solar generators, the power produced by the generator fluctuates, which gives rise to the above-described problems in terms of the feed of power into the network.

OBJECTS AND SUMMARY OF THE INVENTION

The object of the present invention is to provide a method of operating a wind power installation, and a wind power installation, which avoid the disadvantages of the state of the art and in particular avoid voltage over-fluctuations at the consumer, in particular an electrical network, and unwanted shut-down of the wind power installation.

In a method of the kind set forth in the opening part of this specification, that object is attained by the invention in that the power supplied to the network by the wind power generator is regulated in dependence on the applied network voltage of the power supply network.

In an apparatus of the kind set forth in the opening part of this specification, the object of the invention is attained by a regulating device having a voltage sensor for sensing an electrical voltage applied at the consumer, for example network voltage, so that the power supplied to the consumer by the generator can be regulated in dependence on the voltage sensed by the voltage sensor.

As described, in the case of energy generation, there can be a fluctuation in the energy which can be generatec, which in the case of wind power installations is governed by natural conditions in dependence on wind strength. Those fluctuations however are not the basic starting point of the invention. On the contrary, the invention is concerned with the problem that fluctuations in power consumption also occur on the consumer side, which has an effect in the form of a fluctuating network voltage. It is known that such network voltages are critical because electrical equipment— in particular computers—are frequently only inadequately safeguarded against critical voltage fluctuations. The invention therefore provides that not just the fluctuation in energy generation on the generator side but also the fluctuation on the consumer side is taken into consideration in regard to the feed of energy into the system so that the electrical voltage produced is regulated at the feed-in point to the desired reference value.

The invention avoids unwanted fluctuations in the voltage apolied at the consumer, in particular the electrical voltage in a network, insofar as the electrical power delivered by the generator is regulated in dependence on the voltage of the consumer or the network. That also avoids unwanted voltage fluctuations which can arise out of changes in wind power.

A further advantage of the invention is that, even with very substantial changes in wind power, the wind power installation does not need to be shut down in order to avoid fluctuations in the network system. In accordance with the invention, even with considerable changes in wind power, the wind power installation continues to be operated without changes in network voltage occurring. For that purpose the regulating device according to the invention is equipped with voltage sensors for sensing the voltage at the consumer or the network.

In addition, with a constant wind power, it is possible by means of the invention to compensate for network fluctuations as regularly occur in electrical networks for energy power supply as some consumers connected to the network from time to time draw large amounts of power from the network, and that can result in a reduction in voltage. In the case of such a reduction in voltage the wind power installation according to the invention can feed an increased amount of electrical power into the network and in that way it can compensate for voltage fluctuations. For that purpose the feed-in voltage is raised at the interface between the wind power installation and the network, for example on the basis of the network voltage value which is sensed in accordance with the invention.

In accordance with a preferred embodiment of the method according to the invention the power supplied is regulated by the electrical voltage produced being regulated to a desired reference value. In this case network voltage compensation can be implemented in a particularly simple manner, which—as described hereinbefore—can occur when a consumer connected to the network requires a large amount of power.

In accordance with a further preferred embodiment of the invention the electrical voltage is produced in the form of ac voltage at a predeterminable frequency. In that way the power fed into the system can be adapted to the conditions in the network and the network frequency can be influenced thereby. The predeterminable frequency desirably corresponds to the network frequency.

A further development of the wind power installation according to the invention advantageously involves a regulating device having a microprocessor as digital regulation can be implemented in that way.

BRIEF DESCRIPTION OF THE DRAWINGS

The invention is described hereinafter by means of an embodiment of a method of operating a wind power installation with reference to the drawings in which.

DETAILED DESCRIPTION OF THE INVENTION

Figure 1:
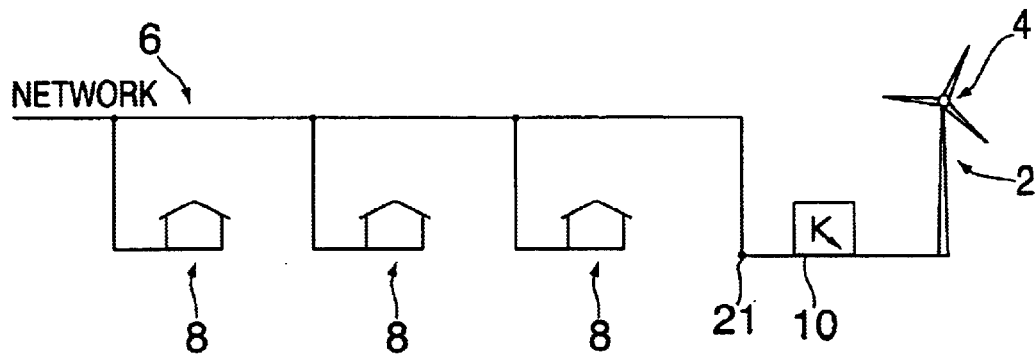
FIG. 1 is a diagrammatic view of a wind power installation which feeds into a network.

A wind power installation 2 diagrammatically illustrated in FIG. 1 and having a rotor 4 is connected to an electrical network 6 which for example can be a public network. Connected to the network are a plurality of electrical consumers 8.

The electric generator (not shown in FIG. 1) of the wind power installation 2 is coupled to an electrical control and regulating arrangement 10 which firstly rectifies the alternating current generated in the generator and then converts it into an ac voltage which corresponds to the network frequency. Instead of a network 6, it would also be possible to supply electrical energy to an individual consumer from the wind power installation 2. The control and regulating arrangement 10 has a regulating device according to the invention.

Figure 2:
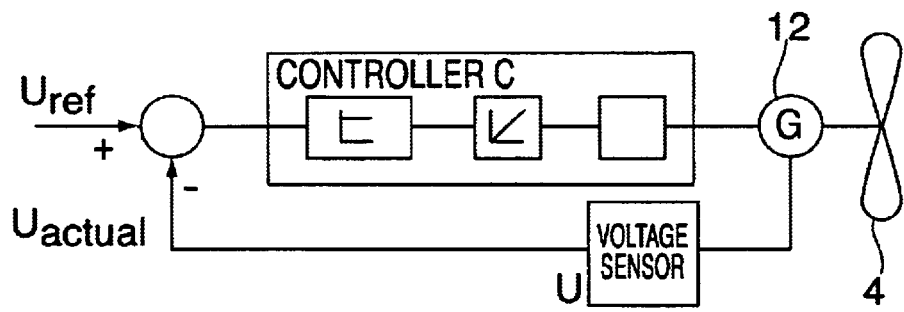
FIG. 2 shows a regulating device according to the invention for the operation of a wind power installation.

FIG. 2 shows the regulating device according to the invention. The diagrammatically illustrated rotor 4 is coupled to a generator 12 producing electrical power which depends on the wind speed and thus the wind power. The ac voltage generated in the generator 12 can firstly be rectified and then converted into an ac voltage which is of a frequency corresponding to the network frequency as illustrated in FIG. 4.

The network voltage is ascertained at a location in the network 6 (FIG. 1) by means of a voltage sensor (not shown). An optimum generator voltage $U_{ref}$ (see FIG. 2) is calculated in dependence on the ascertained network voltage, possibly means of a microprocessor which is shown in FIG. 4 and a voltage sensor U. The generator voltage $U_{actual}$ from sensor U is then regulated to the desired voltage value $U_{ref}$ by means of the regulating device including PDI controller C. That regulation of the generator voltage provides for regulation of the electrical power which is delivered by the generator 12 to a consumer, in the illustrated embodiment being the network 6, and which is fed into the network 6, and which is fed into the network 6. By virtue of this feedback scheme, into the network, fluctuations in the network voltage in the network 6 can be avoided or considerably reduced.

Figure 3:
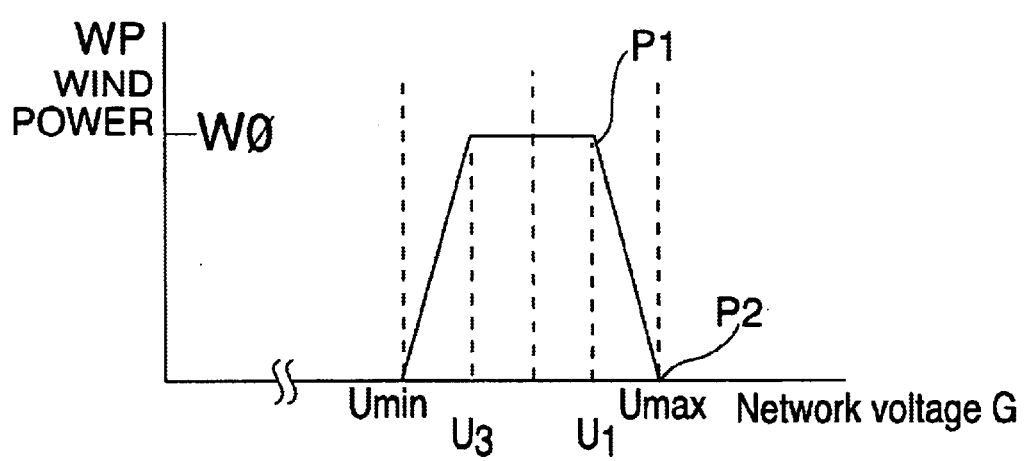
FIG. 3 is a diagram showing the relationship between wind power and network or mains voltage.

The diagram illustrated in FIG. 3 shows th relationship between the power WP which is entered on the ordinate and which is delivered by the wind power installation and the network voltage G which is plotted on the abscissa. If the network voltage differs only little from its reference value which is between the voltage values $U_{min}$ and $U_{max}$ then a uniform level of power WØ is delivered to the network by the generator, corresponding to the upper straight portion of the curve (straight line parallel to the abscissa). If the network voltage rises further and exceeds a value U1 at point P1, the power fed into the network is reduced. When the value $U_{max}$ is reached, then the power WP fed into the network is equal to zero )point P2). Even in the case where there is a high level of wind power, no power is fed into the network at point P2. If the wind power falls sharply, then only a reduced amount of power can still be fed into the network. Even if no further power is delivered on the part of the wind power converted, the latter—although without delivering power—continues to be operated so that power delivery can always be effected as soon as the mains voltage has again assumed a value between $U_{min}$ and $U_{max}$. As shown in FIG. 3 the power PW is also increased from O to WØ as the network voltage G increases from $U_{min}$ to $U_3$.

Figure 4:
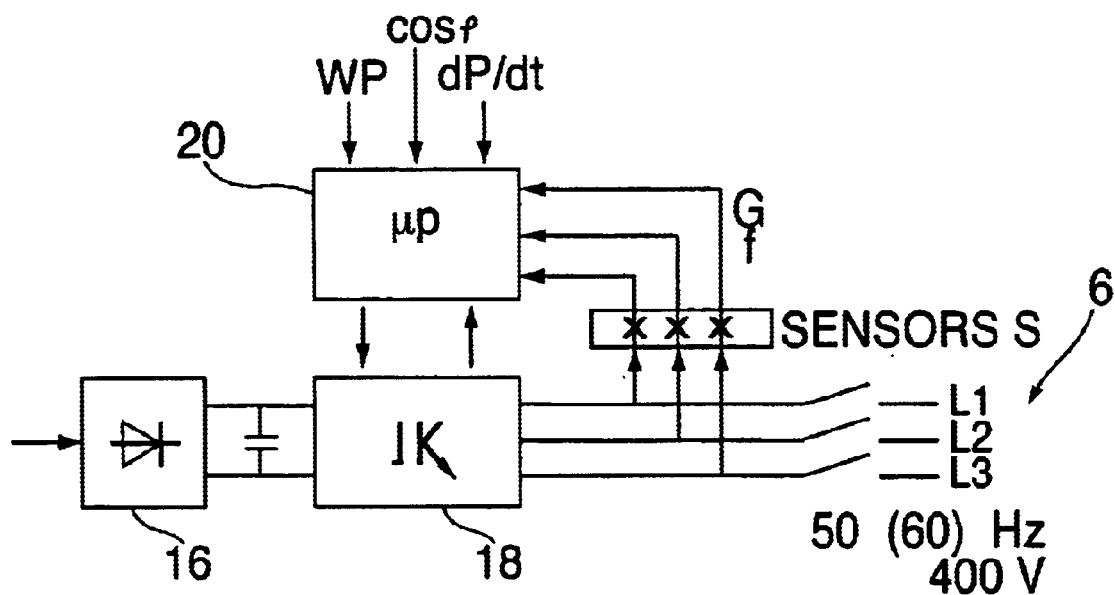

FIG. 4 shows essential components of the control and regulating arrangement 10 in FIG. 1. The control and regulating arrangement 10 has a rectifier 16 in which the ac voltage produced in the generator is rectified. A frequency converter 18 connected to the rectifier 16 converts the initially rectified dc voltage into an ac voltage which is fed into the network 6 by way of the lines L1, L2 and L3, in the form of a three-phase ac voltage. The frequency converter 18 is controlled by means of a microcomputer 20 which is part of the overall regulating device. For that purpose the microprocessor 20 is coupled to the frequency converter 18. The input parameters for regulation of the voltage with which the electrical power afforded by the wind power installation 2 is fed into the network 6 are derived from sensors S and include the current network voltage G, the network frequency f, the electrical power PW of the generator, the reactive power factor cos φ and the power gradient dP/dt. Regulation in accordance with the invention of the voltage to be fed into the network is implemented in the microprocessor 20.

Figure 5:
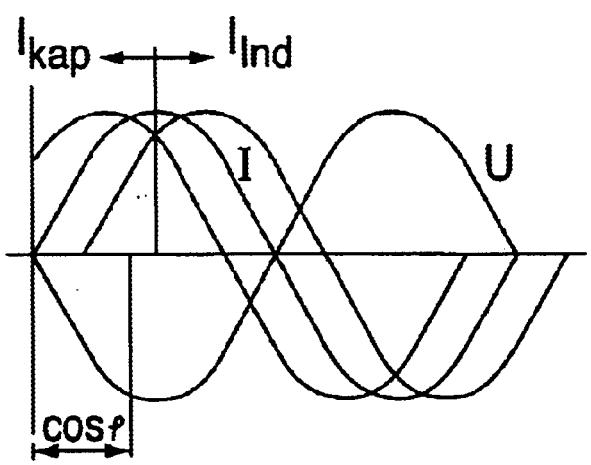

FIG. 5 shows the variation in respect of time of the voltages and currents of the three phases of the network 6.

What is claimed is:

1. A method of operating a wind power installation including an electrical generator driven by a rotor for supplying electrical power to an electrical network having a network voltage and being connected to a customer, comprising:

sensing said network voltage;

supplying electrical power to the electrical network at a supplied power level in accordance with said network voltage; and reducing said supplied power level to a lower level when said network voltage exceeds a threshold value U1.

2. The method of claim 1 wherein said generator is capable of generating said electrical power at a nominal power level dependant on current wind conditions, wherein said lower level is lower than said nominal power level.

3. The method of claim 1 wherein said step of reducing said supplied power level includes reducing said supplied power level gradually as said network voltage increases above said threshold U1.

4. The method of claim 3 wherein said step of reducing said supplied power level includes reducing said electrical power level to a zero level when said network voltage reaches a threshold value Umax.

5. The method of claim 4 wherein said step of reducing further comprises maintaining said supplied power level at said zero level as said network voltage rises above said threshold level $U_{max}$.

6. The method of claim 3 wherein said step of reducing said electrical power includes reducing said electrical power linearly as said network voltage increases between U1 and $U_{max}$.

7. The method of claim 1 wherein said sensing includes sensing said network voltage at the point at which said electrical power is fed to said electrical network.

8. The method of claim 1 further generating said electrical power at a predeterminable frequency.

9. The method of claim 8 wherein said electrical network is operating at a network frequency, wherein predeterminable frequency corresponds substantially to said network frequency.

10. A wind power installation for delivering electrical power to an electrical network comprising:
   a rotor rotated by wind;
   an electrical generator coupled to said rotor and adapted to supply electrical power at a supplied power level to the electrical network; and
   a regulating device having a voltage sensor for sensing a network voltage associated with the electrical network, said regulating device being coupled to said electrical generator to control said power level in accordance with said network voltage, wherein said regulating device is adapted to reduce said supplied power level when said network voltage exceeds a level U1.

11. The wind power installation as set forth in claim 10 wherein said regulating device has a microprocessor.

12. The wind power installation as set forth in claim 10 wherein said regulating device is adapted to reduce said supplied power level from a first threshold to a second threshold level as said network voltage increases from level U1 to a level $U_{max}$.

13. The wind power installation as set forth in claim 12 wherein said regulating device is adapted to reduce said supplied power level from said first to said second threshold level linearly.

14. The wind power installation of as set forth in claim 13 wherein said second threshold level is zero.

15. A method of operating an energy-generating apparatus including an electric generator for supplying electrical power to an electrical network, the electrical network being connected to at least one consumer and having a network voltage that fluctuates with demand, said method comprising:
   supplying electrical power from said electrical generator to said electrical network at a supplied power level; and
   regulating said supplied power level to protect said network from over-voltage by reducing said supplied power level when said network voltage exceeds a value U1.

16. The method as set forth in claim 15 wherein said supplied power level is regulated by reducing said supplied power level to a zero level as said network voltage increases from said value U1 to a value $U_{max}$.

17. The method as set forth in claim 16 wherein said supplied power level is reduced linearly.

18. The method as set forth in claim 16 wherein said supplied power level is maintained at a threshold level as set network voltage increases above said value Umax.

19. The method as set forth in claim 18 wherein said threshold level is zero.

20. The method of claim 15 further comprising increasing said supplied power level as said network voltage increases from a level $U_{min}$ to a level U3, said levels $U_{min}$ and U3 being smaller than said level U1.

21. The method of claim 15 wherein said supplied power level is maintained constant when said network voltage is below said level U1.

22. The method of claim 15 wherein said supplied power level is maintained constant when said network voltage is between a level U3 and U1, U3 being lower than U1.

* * * * *